US008766579B2

(12) United States Patent
Scheit et al.

(10) Patent No.: US 8,766,579 B2
(45) Date of Patent: Jul. 1, 2014

(54) METHOD AND DEVICE FOR MONITORING AND CORRECTING A SENSORLESS ROTOR POSITION DETECTION IN PERMANENTLY EXCITED MOTORS

(75) Inventors: Alexander Scheit, Frankfurt (DE); Horst-Günter Seelig, Frankfurt (DE)

(73) Assignee: Gärtner-Electronic-Design GmbH, Frankfurt (Oder) (DE)

( * ) Notice: Subject to any disclaimer, the term of this patent is extended or adjusted under 35 U.S.C. 154(b) by 157 days.

(21) Appl. No.: 13/499,321

(22) PCT Filed: Sep. 29, 2010

(86) PCT No.: PCT/EP2010/064485
§ 371 (c)(1),
(2), (4) Date: Mar. 30, 2012

(87) PCT Pub. No.: WO2011/039273
PCT Pub. Date: Apr. 7, 2011

(65) Prior Publication Data
US 2012/0181962 A1    Jul. 19, 2012

(30) Foreign Application Priority Data

Oct. 1, 2009 (DE) .......................... 10 2009 045 247

(51) Int. Cl.
*H02P 6/00* (2006.01)
*H02P 27/00* (2006.01)
(52) U.S. Cl.
USPC ................. 318/400.32; 318/400.01; 318/700; 318/727; 318/807
(58) Field of Classification Search
USPC ................ 318/400.01, 400.32, 700, 727, 807
See application file for complete search history.

(56) References Cited

U.S. PATENT DOCUMENTS 5,998,946 A * 12/1999 Kim ......................... 318/400.32
2002/0060548 A1   5/2002 Iwaju et al.
(Continued)

FOREIGN PATENT DOCUMENTS

DE        10311028 A1    10/2004
DE        10314696 A1    10/2004
(Continued)

OTHER PUBLICATIONS

Schroedl M. et al.: Operation of the permanent magnet synchronous machine without a mechanical sensor; Fourth International Conference on Power Electronics and Variable Speed Drives; 1991, IEEE, pp. 51-56; Jul. 17, 2007.

(Continued)

*Primary Examiner* — Eduardo Colon Santana
*Assistant Examiner* — Gabriel Agared
(74) *Attorney, Agent, or Firm* — Gudrun E. Huckett

(57) ABSTRACT

The invention relates to methods and devices for monitoring and correcting a sensorless rotor position detection in permanently excited motors, comprising a control device and a current converter. The invention is especially characterised in that the ambiguity of the rotor position determined from the inductance ratios of the motor, in permanently excited motors, can be resolved in a simple manner without a sensor, and a defectively determined angle can be corrected as required. To this end, during the operation of the motor, the rotor position is detected by means of an inductance-based detection device. Furthermore, the rotor position is monitored in relation to the ambiguity of the inductance-based signals by means of a monitoring/correcting device, and where necessary, an occurring angle error corrected, the currents in the motor being modified.

1 Claim, 3 Drawing Sheets

(56) References Cited

U.S. PATENT DOCUMENTS

Figure 1:
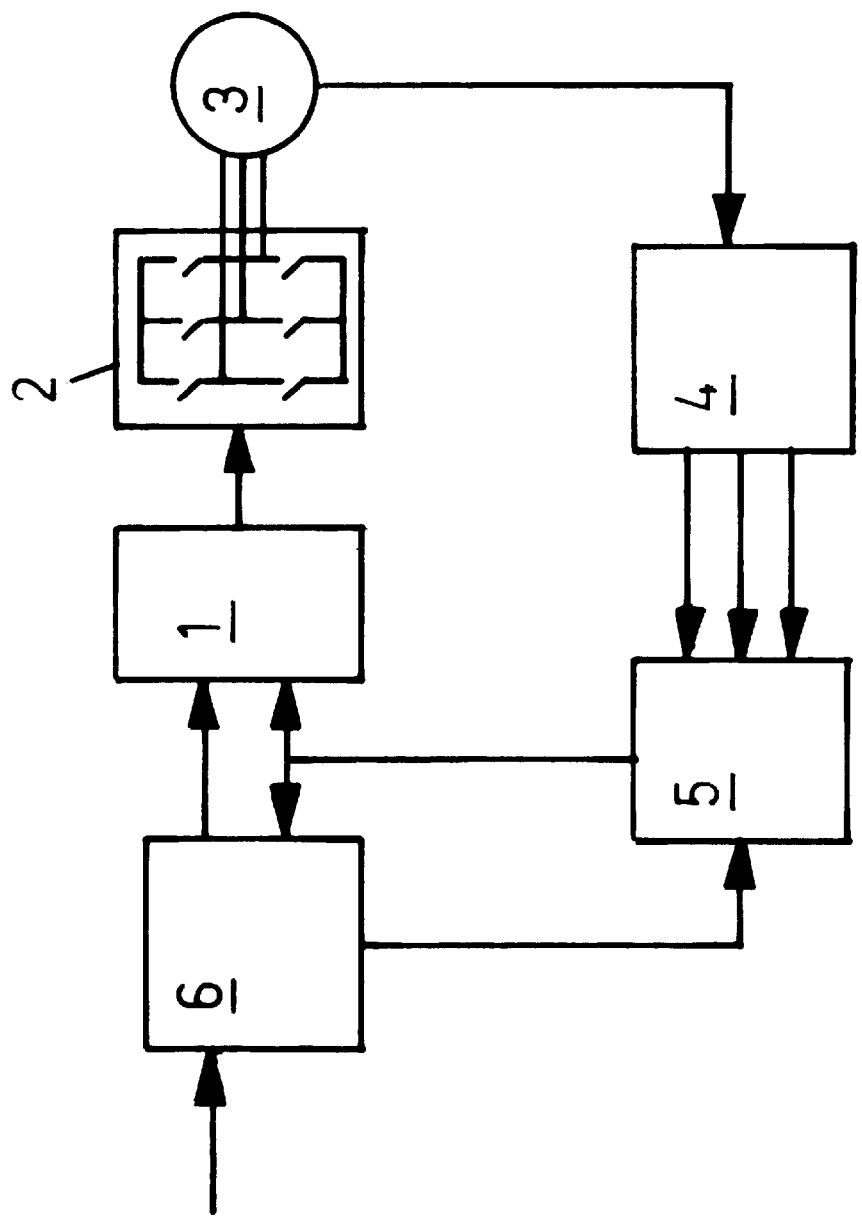

| | | |
|---|---|---|
| 2004/0004455 A1* | 1/2004 | Fujimoto et al. ............... 318/474 |
| 2004/0051495 A1* | 3/2004 | Kaneko et al. ................ 318/807 |
| 2005/0151502 A1* | 7/2005 | Quirion ......................... 318/715 |
| 2007/0031131 A1 | 2/2007 | Griffitts |

FOREIGN PATENT DOCUMENTS

| | | |
|---|---|---|
| EP | 1 401 093 A2 | 3/2004 |
| JP | 2004 254423 A | 9/2004 |
| WO | 90/12278 A1 | 10/1990 |

OTHER PUBLICATIONS

Choi C.-H. et al.: Pulsating Signal Injection-Based Axis Switching Sensorless Control of Surface-Mounted Permanent Magnet Motors for Minimal Zero Current Clamping Effects; IEEE Transactions on Industry Applications, 2008; IEEE, vol. 4, pp. 1741-1748; Nov. 18, 2008.

Bianchi N. et al.: Comparison of PM motor structures and sensorless control techniques for zero speed rotor position detection; Power Electronics, IEEE Transactions; 2007; IEEE, vol. 22, pp. 2466-2475; Nov. 12, 2007.

* cited by examiner

METHOD AND DEVICE FOR MONITORING AND CORRECTING A SENSORLESS ROTOR POSITION DETECTION IN PERMANENTLY EXCITED MOTORS

BACKGROUND OF THE INVENTION

The invention concerns methods and devices for monitoring and correcting a sensorless rotor position detection in permanently excited motors with a control device and current converter.

Permanently excited synchronous motors (PMSM) and brushless direct current motors (BLDC) are comprised of a stator and a rotor with magnets. The individual phases of the stator are star-connected or delta-connected. The motor is operated with a current converter. These motors require electronics that detects the rotor position and supplies the individual phases with current.

The rotor position can be detected by means of sensors. Inter alia, Hall sensors are employed. Sensors require mounting space and cause higher system costs.

In order to avoid these disadvantages, sensorless control methods are employed. They can be roughly classified in two groups.

One group employs the voltage that is induced by movement in the phases. The system-based disadvantage lies in the lack of positional information at standstill.

The second group is based on the variation of the stator inductances. The saturation of the stator inductance is affected by the rotor field of the permanent magnets and the current-caused stator field.

The inductance of a coil in the currentless state is proportional to the relative permeability. As a result of the saturation effects that occur in the core, with increasing field strength the relative permeability drops or, stated differently, the magnetic resistance increases. In this connection, only the absolute value but not the direction is decisive. Thus, a rotor position-dependent function of the inductance for a BLDC motor results. When the motor has three phases, the functions are displaced relative to each other by 60 electrical degrees. In the currentless state, the north and the south poles of the rotor magnets have the same effect. Therefore, these functions of the inductivities have twice the periodicity relative to the electrical period. This ambiguity must be resolved for a complete position information. A current-excited field is superimposed on the stator field. In this way, the saturation in the motor is either amplified or reduced and the corresponding inductance is thus reduced or enlarged. This effect affects also the angle determination in case of useful current feed of the motor and causes a faulty determination of the rotor position.

The invention has the object to simply resolve the ambiguity of the rotor position, determined based on the inductance ratios of the motor, for permanently excited motors without a sensor and, as needed, to correct an erroneously determined angle.

SUMMARY OF THE INVENTION

This object is solved for a method of the aforementioned kind in that during the operation of the motor the rotor position is detected by means of an inductance-based detection device and in that, by means of a monitoring/correcting device, the rotor position with respect to the ambiguity of the inductance-based signals is monitored and, as needed, an angle error that has occurred is corrected, wherein the currents in the motor are varied. The object is further solved in connection with the device of the aforementioned kind in that a detection device of the rotor position of the operating motor is connected with a monitoring/correcting device for monitoring the ambiguity of the rotor position detection and, as needed, for correcting the rotor position; a control device; and a current converter with the motor, wherein the currents in the motor are varied and thus the current dependency of the stator inductances is used for correction.

The methods and devices are characterized in particular in that the ambiguity of the rotor position, determined based on the inductance ratios of the motor, in permanently excited motors can be simply resolved without a sensor and an erroneously determined angle can be corrected as needed.

For this purpose, during operation of the motor the rotor position is detected by means of an inductance-based detection device. Moreover, by means of a monitoring/correcting device, the rotor position is monitored with respect to the ambiguity of the inductance-based signals and, as needed, an angle error that has occurred is corrected wherein the currents in the motor are varied.

In a device, a detection device of the rotor position of the operated motor is connected for this purpose with a monitoring/correcting device for monitoring the rotor position and, as needed, for correcting the rotor position; a control device; and a current converter to the motor in such a way that the currents in the motor are varied and thus the current dependency of the stator inductances is used for correction.

Permanently excited synchronous motors (PMSM) and brushless direct current motors (BLDC) are comprised of a stator and a rotor with magnets. The individual phases of the stator are star-connected or delta-connected. The motor is operated with a current converter. These motors require control electronics that determines the rotor position and that supplies current to the individual phases. Inter alia, sensorless control methods are used wherein either the voltage that is induced by movement in the phases or the changing stator inductances are evaluated. In the first method, the system-based disadvantage is the lack of positional information at standstill. In the second method, the saturation of the stator inductance by the rotor field of the permanent magnets and the current-caused stator field are utilized in order to determine the rotor position.

Inductance-based methods and devices inter alia must resolve also the ambiguity of the rotor position-dependent functions of the variation of the inductances. This is done mostly at the beginning of the motor operation. During motor operation, this information is usually saved. In case the positional detection determines the position of the rotor wrongly or the saved data are falsified or are even lost, it may happen in extreme cases that the rotor rotates in the wrong direction.

On the other hand, the rotor position is affected by current supply. Therefore, the motor cannot be operated in an optimal range.

The methods and devices are characterized advantageously in that the rotor position is observed/monitored and optionally corrected in that the effect of the current changes in the stator inductances on the angle determination is analyzed and, in this way, the superposition of the magnetic flux is evaluated. For this purpose, either the rotor position or the inductance-based signals are detected.

The device is positioned in the systems such that
  the motor voltage,
  the phase angle of the current supply, or
  the individual phase currents are variable in a targeted fashion, respectively.

In these three variants, the current dependency of the stator inductances and the resulting change of the inductance-based signals or the rotor position are used. The measuring periods of the devices are selected such that the motor operation is not to disturbed. Expressed differently, the time between two measurements should be significantly below the dynamics of the motor/the application.

In addition, advantageously the time can be optimized in addition as a function of speed.

Advantageous embodiments of the invention are disclosed in the dependent claims.

Favorably, the rotor position is determined during operation of the motor by means of a measurement of inductances or the relations between the inductances.

According to another embodiment, advantageously, the current dependency of the stator inductances is used for monitoring and correction.

For monitoring and correction by means of the monitoring/correcting device, the motor voltage is varied, and thus the motor current, so that, on average, the predetermined motor voltage results. The monitoring/correcting device detects in this connection the reaction of the detection device of the rotor position.

According to another embodiment, the detection device of the rotor position is connected for this purpose for transmission of the rotor position with the monitoring/correcting device and the control device wherein by means of the monitoring/correcting device the motor voltage is increased and decreased so that, on average, the predetermined motor voltage results. The monitoring/correcting device is furthermore connected for transmission of the corrected rotor position with the detection device so that the monitoring/correcting device detects the reaction of the detection device of the rotor position.

In this way, the motor voltage is varied. It is increased and decreased so that, on average, the predetermined motor voltage results. As a result of the high mechanical time constant of the motor, the change of the angular speed that is caused by the torque change is minimal. The detection device detects the reaction of the rotor position detection.

For monitoring and correcting by means of the monitoring/correcting device, the phase position of the current supply is shifted. Thereupon, the amplitudes of the inductance-based signals are detected.

For this purpose, the detection device of the rotor position, is connected for transmission of the inductance-based signals and the rotor position with the monitoring/correcting device, wherein, for monitoring and correction by means of the monitoring/correcting device, the phase position and, as a result thereof, the rotor position is shifted. The monitoring/correcting device is moreover, connected for transmission of the corrected rotor position with the detection device. Moreover, the monitoring/correcting device is connected for transmission of the varied rotor position with the control device so that the inductance-based signals are detected.

In this context, the rotor position is varied or, expressed differently, the phase position of the current supply is shifted. Detected are in this connection the amplitudes of the inductance-based signals.

By means of the monitoring/control device, the inductance-based signals are detected and the PWM modified. Accordingly, the currents in the phases are changed in a targeted fashion and the reaction of the inductance-based signals detected.

According to another embodiment, the detection device of the rotor position is connected for transmission of the inductance-based signals with the monitoring/correcting device wherein, for monitoring and correction, the inductance-based signals are detected. Moreover, the detection device is connected for transmission of the rotor position with the control device. Moreover, the monitoring/correcting device is connected with the control device in such a way that currents in phases are changed in a targeted fashion wherein the actual switching states of the control device and varied switching states of the monitoring/correcting device derived therefrom are transmitted. The monitoring/correcting device is furthermore connected for transmission of corrective values with the detection device, wherein, based on the inductance-based signals and independently calculated PWM (pulse width modulation), a targeted current supply change is integrated into a PWM pattern in the monitoring/correcting device.

The monitoring/correcting device is capable of calculating the PWM on its own. It detects the inductance-based signals. The system is capable of manipulating in a targeted fashion currents in phases.

Ideally, the currents in a further development are varied in the phases that have the magnet poles of the rotor immediately oppositely positioned. During normal motor operation hardly any current is flowing through these phases. When in these phases the current is changed, the greatest effect on the respective inductances is observed. The torque that is generated by the current is very small. This targeted current supply can be integrated easily into a PWM pattern.

The reaction of the inductances is detected and evaluated. The detection of the rotor position can be disturbed by the variation of the PWM pattern. Therefore, the correction device must compensate the effect of reactive currents.

BREIF DESCRIPTION OF THE DRAWINGS

One embodiment of the invention is illustrated in principle in the drawings, respectively, and will be explained to the following in more detail.

Figure 2:
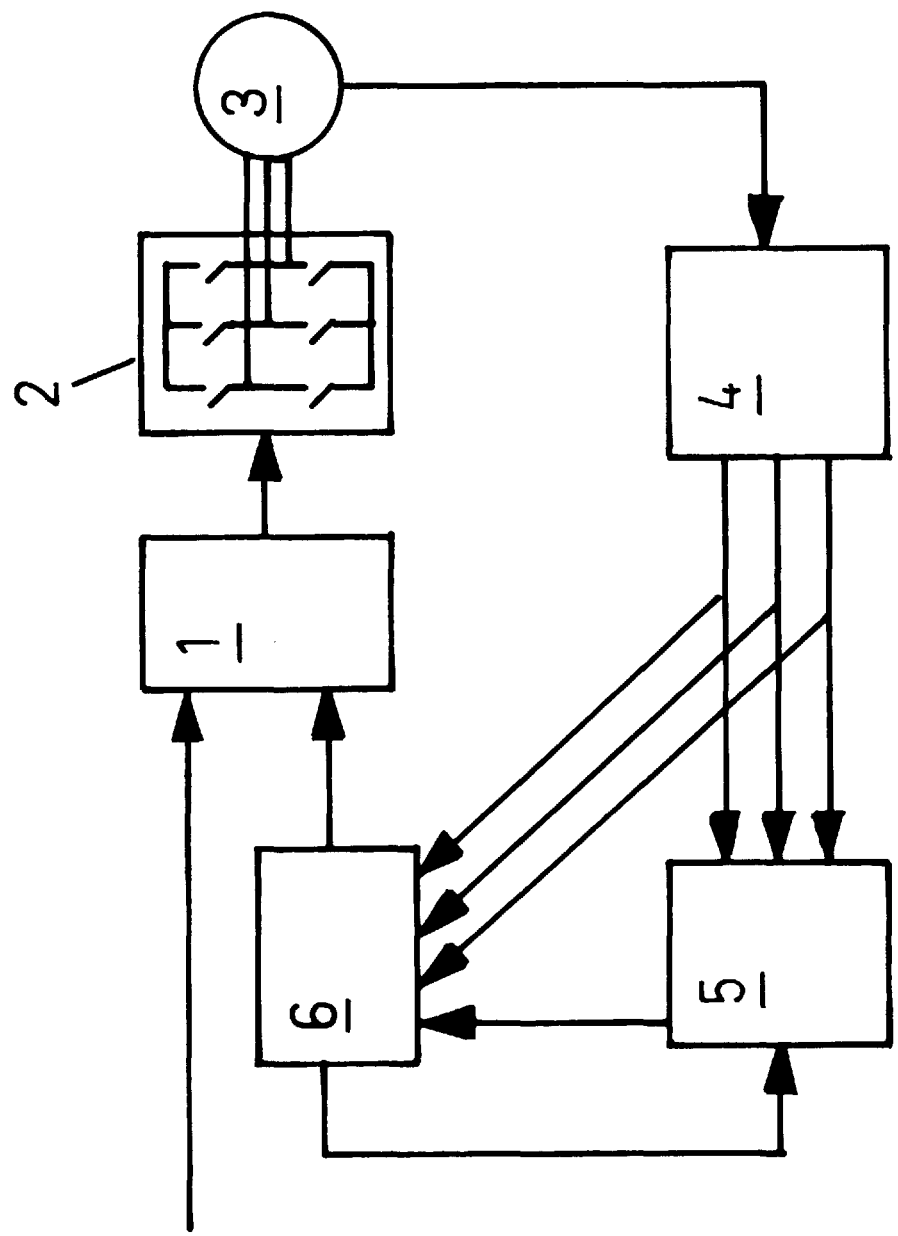
Figure 3:
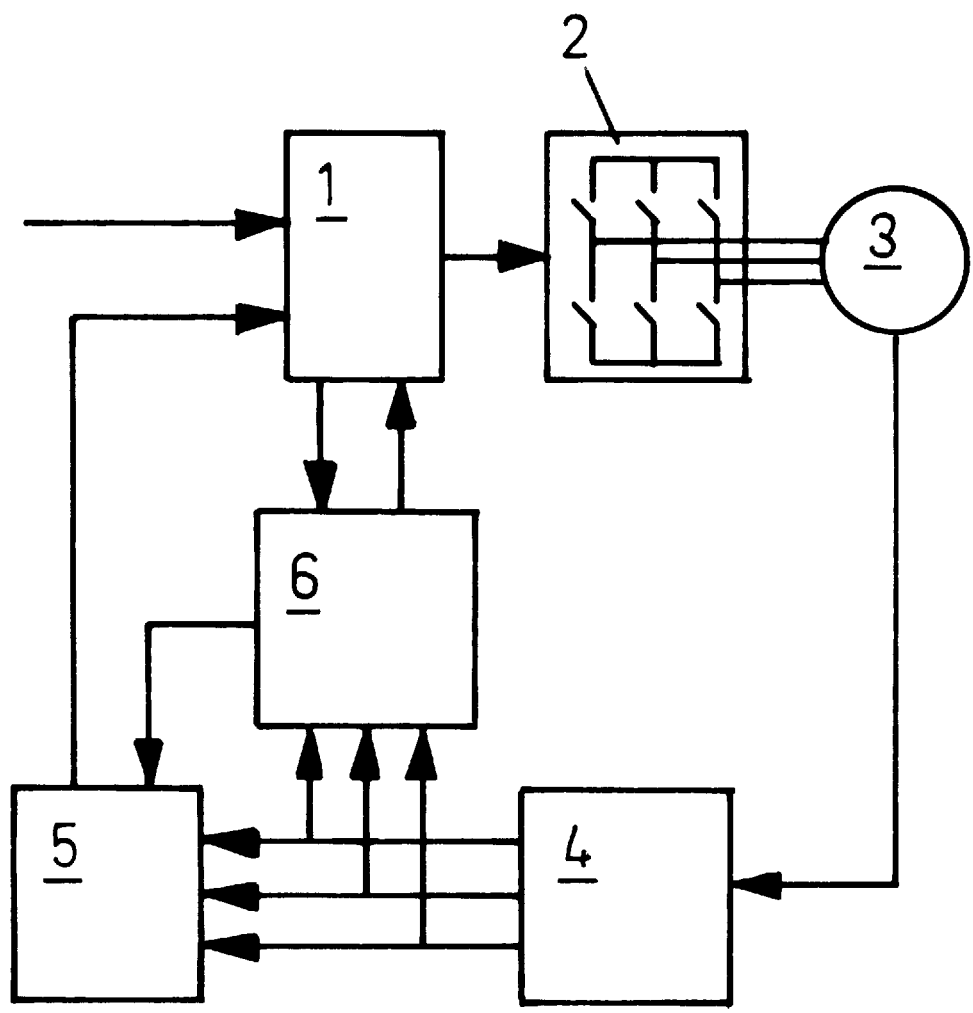

It is shown in:

FIG. 1 a device for monitoring and correcting a sensorless rotor position detection in permanently excited motors, wherein the motor voltage is varied;

FIG. 2 a device for monitoring and correcting a sensorless rotor position detection in permanently excited motors, wherein the phase angle of the current supply is varied; and FIG. 3 a device for monitoring and correcting a sensorless rotor position detection in permanently excited motors, wherein individual phase currents are variable in a targeted fashion, respectively.

DESCRIPTION OF PREFERRED EMBODIMENTS

In the following embodiments, methods and devices for monitoring and correcting a sensorless rotor position detection for permanently excited motors will be explained jointly in more detail, respectively.

A device for monitoring and correcting a sensorless rotor position detection in permanently excited motors is comprised substantially of a detection device 4, 5 of the rotor position of the operating motor 3; a monitoring/correcting device 6 for resolution of the ambiguity of the rotor position detection and as needed for correcting the determined rotor position; a control device 1; and a current converter 2 with the motor 3.

In the device for monitoring and correcting a sensorless rotor position detection in permanently excited motors 3, the detection device 4, 5 of the rotor position of the operating motor 3 is connected with the monitoring/correcting device 6 for resolution of the ambiguity of the rotor position detection and, as needed, for correcting the rotor position, the control device 1, and the current converter 2 to the motor 3, wherein the currents in the motor 3 are varied and thus the current dependency of the stator inductances is used for correction.

In this context, for monitoring and correcting a sensorless rotor position detection in permanently excited motors 3, the rotor position is detected during operation of the motor by means of detection device 4, 5 and by means of the monitoring/ correcting device 6 the ambiguity of the rotor position detection is resolved and, as needed, corrected, wherein the currents in the motor are varied.

In this context, during operation of the motor 3 the rotor position is determined by means of measuring the inductances or the relations between the inductances, wherein the motor 3 is connected with a device 4 for inductance determination as a component of the detection device 4, 5. Based on the inductance-based signals of this device 4, in a device 5 for rotor position detection the rotor position is detected. This device 5 is also a component of the detection device 4, 5.

The device is positioned within the system such that
in a first embodiment variant the motor voltage,
in a second embodiment variant the phase angle of the current supply, or
in a third embodiment individual phase currents are varied in a targeted fashion, respectively.

In the device of the first embodiment with a variation of the motor current, the detection device 4, 5 of the rotor position is connected for transmission of the rotor position with the monitoring/correcting device 6 and the control device 1, wherein, by means of the monitoring/correcting device 6, the motor voltage is increased and decreased so that, on average, the predetermined motor voltage results. The monitoring/ correcting device 6 is connected for transmission of the corrected rotor position with the detection device 4, 5 such that the monitoring/correcting device 6 detects the reaction of the detection device 4, 5 of the rotor position.

FIG. 1 shows a device for monitoring and correcting a sensorless rotor position detection in permanently excited motors 3 in a principal illustration with a current converter 2, wherein the motor voltage is varied.

In this context, for monitoring and correcting by means of monitoring/correcting device 6, the motor voltage is increased and decreased so that, on average, the predetermined motor voltage results. Moreover, with the monitoring/ correcting device 6 the reaction of the detection device 4, 5 of the rotor position is detected.

In a device according to the second embodiment, with a variation of the phase angle of the current supply, the detection device 4, 5 of the rotor position is connected for transmission of the inductance-based signals and the rotor position with the monitoring/correcting device 6, wherein, for monitoring and correction by means of the monitoring/correcting device 6, the phase position is shifted and as a result thereof the rotor position. Moreover, the monitoring/correcting device 6 is connected for transmission of the corrected rotor position with the detection device 4, 5. The monitoring/correcting device 6 is moreover connected for transmission of the varied rotor position with the control device 1, wherein the amplitudes of the inductance-based signals are detected.

FIG. 2 shows a device for monitoring and correcting a sensorless rotor position detection for permanently exited motors 3 in a principal illustration with a current converter 2 wherein the phase angle of the current supply is varied.

In this context, for monitoring and correcting by means of the monitoring/correcting device 6, the phase position of the current supply is shifted, and as a result thereof the rotor position, and the amplitudes of the inductance-based signals are detected.

In a device according to the third embodiment with a targeted variation of individual phase currents, the detection device 4, 5 of the rotor position is connected for transmission of the inductance-based signals with the monitoring/correcting device 6, wherein the inductance-based signals are detected for monitoring and correction. The detection device 4, 5 is connected for transmission of the rotor position with the control device 1. The monitoring/correcting device 6 is connected with the control device such that currents are changed in the phases in a targeted fashion, wherein actual switching states of the control device 1 and varied switching states of the monitoring/correcting device 6 are transmitted. The monitoring/correcting device 6 is connected for transmission of corrective values with the detection device 4, 5 wherein in the monitoring/correcting device 6, based on the inductance-based signals and independently calculated PWM, a targeted current supply is integrated into a PWM pattern.

FIG. 3 shows a device for monitoring and correcting a sensorless rotor position detection in permanently excited motors 3 in a principal illustration with a current converter 2, wherein individual phase currents are variable in a targeted fashion.

By means of the monitoring/controlling device 6 the inductance-based signals are detected and the PWM modified. In this way, the currents are changed in the phases in a targeted fashion and the reaction of the inductance-based signals are detected.

In this embodiment variant, in a targeted fashion currents are varied in the phases that have the magnet poles of the rotor immediately oppositely positioned.

What is claimed is:

1. A device for monitoring and correcting a rotor position of a brushless direct current motor (3), wherein a detection device (4, 5) of the rotor position of the operating motor (3) is connected for transmission of detected inductance-based signals with a monitoring/correcting device (6) for monitoring the ambiguity of the rotor position detection and, as needed, for correcting the rotor position; a control device (1); and a current converter (2) with the motor (3), wherein the detection device (4, 5) for transmission of the rotor position is connected with the control device (1), wherein the monitoring/ correcting device (6) is connected to the control device (1) such that currents are changed in a targeted fashion in phases in which the magnet poles of the rotor are immediately oppositely positioned to each other, wherein actual switching states of the control device (1) and varied switching states of the monitoring/correcting device (6) derived therefrom are transmitted, wherein the monitoring/correcting device (6) for transmission of corrective values is connected with the detection device (4, 5), wherein in the monitoring/correcting device (6), based on the detected inductance-based signals that are measured such that a time between two measurements is significantly below the dynamics of the motor (3) and based on an independently calculated PWM (pulse width modulation), a targeted current supply change, with compensation of the effect of reactive currents by the monitoring/correcting device (6), is integrated into a PWM pattern.

\* \* \* \* \*